Dec. 19, 1967     H. E. HOLLNAGEL ETAL     3,358,793
COMPACT FLOATING DISC BRAKE
Filed Oct. 20, 1965
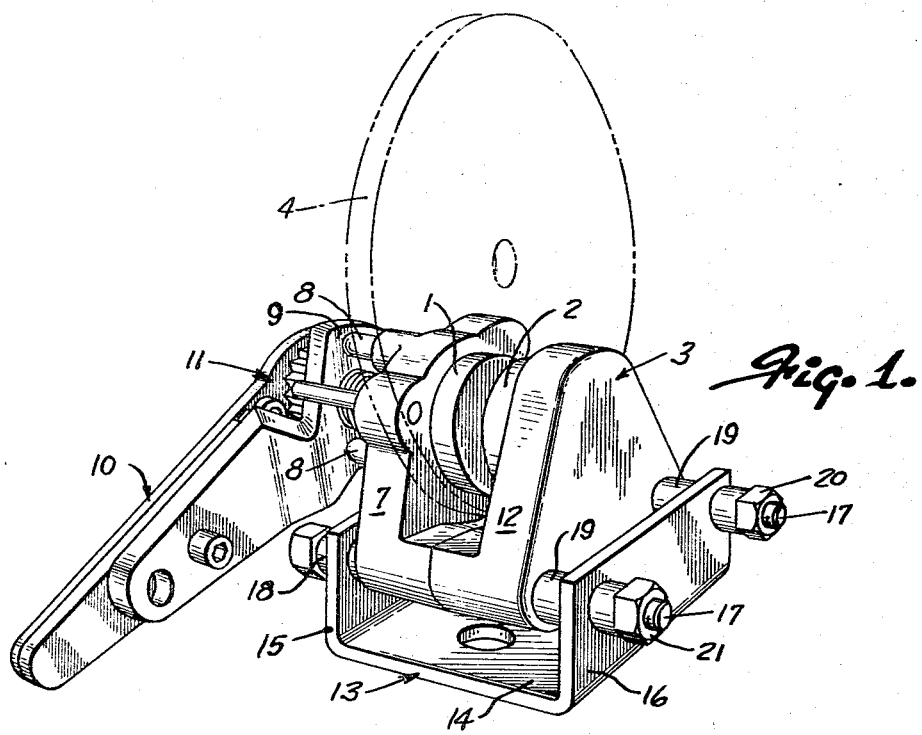
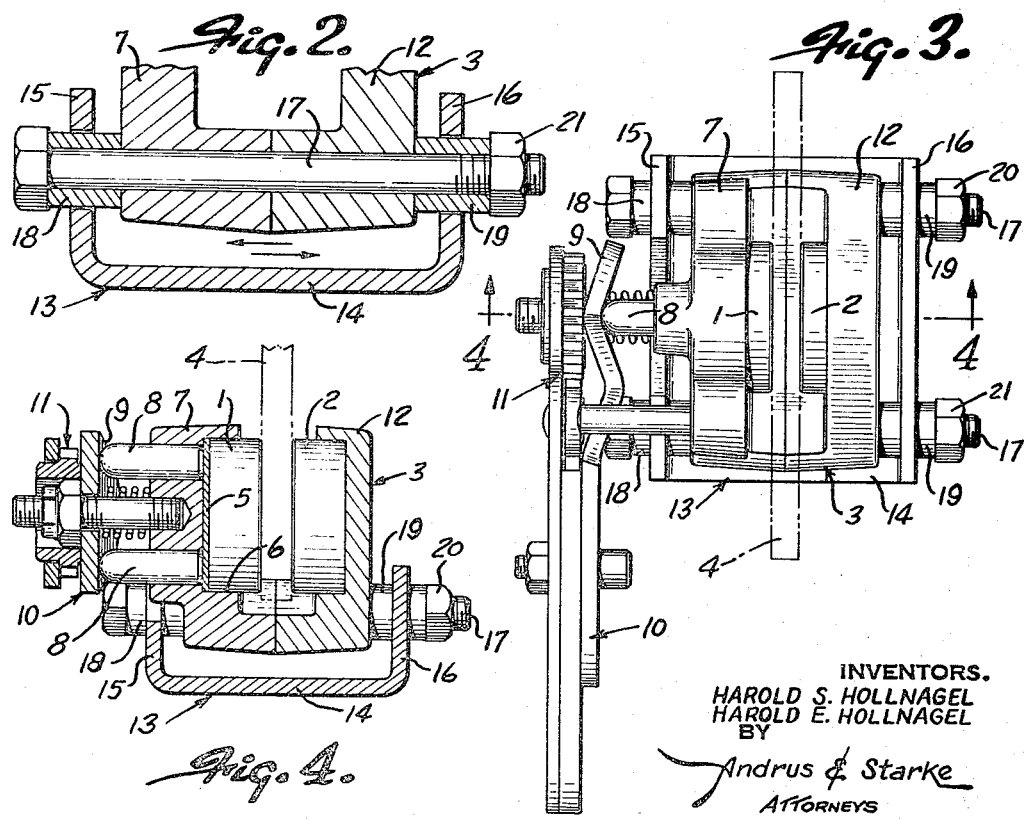
INVENTORS.
HAROLD S. HOLLNAGEL
HAROLD E. HOLLNAGEL
BY
Andrus & Starke
ATTORNEYS

United States Patent Office 3,358,793
Patented Dec. 19, 1967

3,358,793
COMPACT FLOATING DISC BRAKE
Harold E. Hollnagel, 10229 N. River Road 43W, Mequon, Wis. 53092; and Harold S. Hollnagel, 918 W. Laramie Lane, Milwaukee, Wis. 53217
Filed Oct. 20, 1965, Ser. No. 498,808
2 Claims. (Cl. 188—73)

ABSTRACT OF THE DISCLOSURE

A caliper type disc brake is mounted on cross bolts extending freely through the flanges of a rigid channel support to provide for free lateral movement of the brake as a unit and thereby compensate any misalignment of the disc therewith. The caliper has fixed arms carrying friction pads with one pad movable relative to its arm to provide the brake action.

---

This invention relates to a compact floating disc brake.

Small disc brakes present problems of construction and maintenance which are generally avoided in more expensive and larger brakes, largely due to the necessarily low cost construction required.

Among the problems encountered in low cost small brakes is that of undue wear of the brake pads, warpage of the disc and the often encountered misalignment between the disc and the pads arising from the necessarily wide tolerances of the parts in assembly.

In carrying out the invention the brake mounting is disposed generally in the plane of the disc with opposing brake pads on opposite sides of the disc carried by a laterally floating caliper on the mounting so that the pads equalize in their braking pressure on the disc and in release from the disc. The pads are free from drag upon the disc when released.

The accompanying drawings illustrate the best mode presently contemplated by the inventors for carrying out the invention.

In the drawings:

FIGURE 1 is a perspective view of the brake showing the disc upon which it operates, in phantom;

FIG. 2 is a detail transverse section taken axially of one of the bolts securing the caliper to the rigid mounting;

FIG. 3 is a top plan view of the brake; and

FIG. 4 is a transverse section taken generally axially of the brake pads and showing the actuating mechanism.

Referring to the drawing, the opposed brake pads 1 and 2 are carried by the opposite arms of caliper 3 and are disposed on opposite sides of the rotary disc 4 to which they apply the braking friction.

Pad 1 is carried on a laterally movable plate 5 in a recess 6 in the inner face of corresponding caliper arm 7 and is actuated by push rods 8 extending through arm 7 and projecting in the path of an actuating cam 9 on lever 10.

Pad 2 is rigidly carried on the inner face of corresponding arm 12 of caliper 3.

Various means such as the ratchet take-up mechanism 11 may be employed to adjust the position of cam 9 and compensate for wear on pads 1 and 2.

In carrying out the invention the pads 1 and 2 are self-aligning with disc 4 so that the braking force applied by the pads is more nearly equalized therebetween and undue wear from drag is avoided.

For this purpose the caliper 3 is laterally floating on a rigid support mounting 13 which is illustrated as an upwardly facing channel member 14 having upstanding spaced side flanges 15 and 16, but which may be of various constructions.

A pair of stud bolts 17 extend through the flanges 15 and 16 and the abutting bases of caliper arms 7 and 12 are disposed between the flanges.

Sleeves 18 and 19 are provided on opposite ends of each stud bolt 17 and serve to secure the caliper arms 7 and 12 together when the nuts 20 and 21 are applied to the corresponding bolt. Thus the caliper 3, sleeves 18 and 19 and bolts 17 become a rigid structure.

The holes in flanges 15 and 16 for bolts 17 are of a diameter to receive sleeves 18 and 19 loosely, whereby the sleeves may move axially freely through the holes.

The flanges 15 and 16 are spaced apart to provide a limited lateral freedom of movement of caliper 3 between the flanges.

With the construction just described, the caliper 3 floats in mounting 13 to accommodate the pads 1 and 2 to the disc 4 at all times.

Various modes of carrying out the invention are contemplated as being within the scope of the following claims particularly pointing out and distinctly claiming the subject matter which is regarded as the invention.

We claim:

1. In a brake of the class described, a caliper having a base with relatively fixed arms extending in substantially parallel spaced relation therefrom and said arms carrying opposed brake pads for applying friction to a rotary disc disposed therebetween, a fixed channel support straddling the base of said caliper and having its flanges spaced on opposite sides of the caliper and encompassing said base, said support flanges being spaced apart and each being spaced substantially from the nearest corresponding side of said caliper base, and laterally extending means fixed to said caliper base on opposite sides at each end thereof and slidably extending through corresponding openings in said corresponding flanges to provide free lateral floating movement of said caliper upon said fixed support.

2. In a brake of the class described, a caliper comprising a pair of arms carrying corresponding opposing brake pads and having abutting bases, a pair of stud bolts extending through the bases of said caliper arms, sleeves on the opposite ends of said bolts, nuts threaded upon the opposite ends of said bolts to secure said caliper arms together rigidly between said sleeves, and a rigid channel support straddling the abutting bases of the caliper and having flanges spaced on opposite sides of the caliper and encompassing said abutting bases, said flanges having holes therein through which said sleeves extend freely for floating said caliper laterally.

References Cited

UNITED STATES PATENTS

| 2,784,811 | 3/1957 | Butler | 188—73 |
| 2,820,530 | 1/1958 | Chovings et al. | 188—73 |
| 2,843,225 | 7/1958 | Miller | 188—73 |
| 2,966,964 | 1/1961 | Brueder | 188—73 |
| 3,213,969 | 10/1965 | Rosanowski et al. | 188—73 |

MILTON BUCHLER, *Primary Examiner.*

G. E. A. HALVOSA, *Assistant Examiner.*